United States Patent [19]
Garcia

[11] Patent Number: 5,909,520
[45] Date of Patent: Jun. 1, 1999

[54] NOISE CODING PROCESSOR

[75] Inventor: Joseph P. Garcia, Waldorf, Md.

[73] Assignee: The United States of America as represented by the Secretary of the Navy, Washington, D.C.

[21] Appl. No.: 08/934,012

[22] Filed: Aug. 25, 1997

[51] Int. Cl.⁶ .................................................. G06H 9/36
[52] U.S. Cl. ........................... 382/303; 364/131; 380/46; 382/234
[58] Field of Search .................................. 382/234, 302, 382/303, 304, 307; 395/163; 364/131; 380/42, 46

[56] References Cited

U.S. PATENT DOCUMENTS

| | | |
|---|---|---|
| 3,351,859 | 11/1967 | Groth, Jr. et al. . |
| 4,379,206 | 4/1983 | Aoki .......................................... 380/46 |
| 4,524,455 | 6/1985 | Holsztynski et al. .................... 382/303 |
| 4,650,862 | 3/1987 | Imamura et al. ....................... 536/17.1 |
| 4,805,227 | 2/1989 | Wehner .................................... 382/303 |
| 4,829,585 | 5/1989 | Pape ......................................... 382/277 |
| 4,949,390 | 8/1990 | Iverson et al. .......................... 382/258 |
| 5,113,444 | 5/1992 | Vobach ...................................... 380/47 |
| 5,420,941 | 5/1995 | Capo et al. .............................. 382/302 |
| 5,438,622 | 8/1995 | Normile et al. .......................... 380/46 |
| 5,452,358 | 9/1995 | Normile et al. .......................... 380/42 |
| 5,541,995 | 7/1996 | Normile et al. .......................... 380/42 |
| 5,642,444 | 6/1997 | Mostafavi ............................... 382/303 |
| 5,657,403 | 8/1997 | Wolff et al. ............................. 382/302 |

OTHER PUBLICATIONS

C.M. Gray et al, "Oscillatory Responses in Cat Visual Cortex Exhibit Inter–Columnar Synchronization which Reflects Stimulus Properties," Nature 1989, V338, p. 334.

W.J. Freeman, "The Physiology of Perception," Scientific American February, 1991.

R. Eckhorn et al, "Feature Linking via Synchronization Among Distributed Assemblies: Simulations of Results from Cat Cortex," Neural Comput 2, 293–307, 1990.

Primary Examiner—Joseph Mancuso
Assistant Examiner—Gregory Desire
Attorney, Agent, or Firm—James B. Bechtel, Esq.

[57] ABSTRACT

A noise coding processor employing pipeline processing techniques is disclosed. The noise coding processor employs parallel pseudo-random number sequence generation to generate multi-dimensional fields of pseudo-random sequences. The noise coding processor is particularly suited for use in pattern recognition applications and accepts signals representing feature correlations as inputs and derives a pattern to test the feature coherence therefrom.

7 Claims, 7 Drawing Sheets

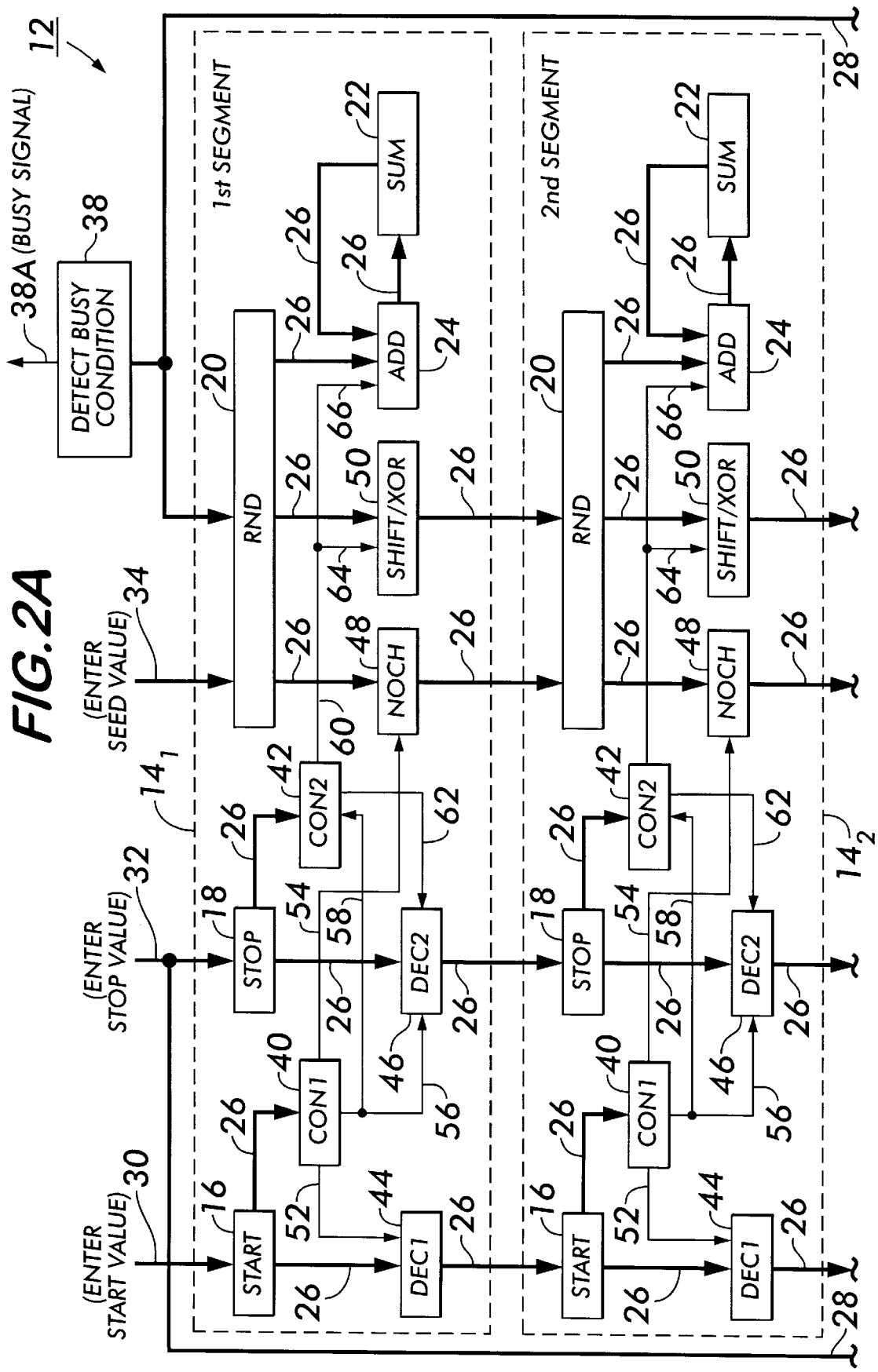

NOISE CODING PROCESSOR

CROSS-REFERENCE TO RELATED APPLICATIONS

This application is related to U.S. patent applications Ser. Nos. 08/833,482, 08/920,289 respectively having Attorney Docket Nos. 77387 and 78226.

STATEMENT OF GOVERNMENT INTEREST

The invention described herein was made by an employee of the United States Government and may be manufactured and used by or for the Government for governmental purposes without the payment of any royalties thereon or therefor.

FIELD OF THE INVENTION

This invention relates generally to a circuit that binds together detected image features of an unknown object in a manner to facilitate recognition of the unknown object and, more particularly, to a noise coding processor employing pipeline processing techniques to implement parallel pseudo-random number generation to provide a means for establishing coherence between the above recognized input features. The pseudo-random sequence generated by this device has a noise-like quality, hence the name "noise coding."

BACKGROUND OF THE INVENTION

Many attempts have been made at developing artificial vision systems otherwise known as pattern recognition systems for automatic target recognition (ATR). Currently artificial vision systems are limited to fixed viewing aspects and carefully controlled and lighting conditions. Real world artificial vision problems such as ATR exhibit a great degree of variability and are beyond the scope of conventional artificial vision systems. Incorporating aspects of biological visions systems may be the key to developing truly effective artificial vision systems for real world problems. One biologically influenced approach to ATR involves performing a decomposition of an image into its constituent features. It is believed by scientists who study the brain that there are "feature detector" neurons operating in the human vision system. It is further believed by these scientists that edge features are the most likely type of feature used by brains since most of the information in an image is contained within the edges in a manner more fully described in the book *Vision* authored by D. Marr and published by Freeman, San Francisco, 1982, with the applicable sections thereof being incorporated by reference. However, the recognition of edge features or combinations thereof does not solve the computer vision problem. It imposes a requirement to "bind" the recognized edges into a coherent pattern.

Observations of coherent oscillatory behavior in the brains of test animals have been reported in recent years (see C. M. Gray et al, "Oscillatory Responses in Cat Visual Cortex Exhibit Inter-Columnar Synchronization which Reflects Stimulus Properties," Nature, v. 338, p.334, 1989, which is herein incorporated by reference). Currently many brain scientists are of the view that complex nonlinear dynamics across many neurons implement feature binding (see W. J. Freeman, "The Physiology of Perception," Scientific American, February, 1991 and R. Eckhorn et al, "Feature Linking via Synchronization Among Distributed Assemblies: Simulations of Results from Cat Cortex," Neural Comput. 2, 293–307, 1990; both of which techniholds that coherence is the outward manifestation of feature binding caused by nonlinear dynamics, the teaching behind the present invention holds that coherence is the very process by how binding occurs. The teaching behind the present invention posits that local processing elements (implemented by small groups of neurons) transform the detections of simple relationships among small numbers of features into representative signals of which the coherence relation with respect to other representative signals may be detected. Unlike the present invention, the popular theory would not be implementable in conventional computer architecture. It would require a massive array of analog electronic circuits to implement. Making this work would involve overcoming formidable engineering challenges. Conversely, the teaching behind the present invention, as will be shown, is very amenable to conventional computer architecture.

A method of performing an edge feature decomposition, generating an invariant representation of edge features, detecting the invariant feature relations in an input image of an unknown object and binding the associated edge features by a noise coding process is described in the cross-referenced patent application Ser. No. 08/833,482 having Attorney Docket No. 77387. Also disclosed in U.S. patent application Ser. No. 08/920,289 having Attorney Docket No. 78226 is a hardware implementation to accommodate the edge feature decomposition. In the above referenced inventions, following the edge feature decomposition, the decomposed image is further transformed into digital quantities representing relations between the features which are compared against prestored digital quantities so that the transformed representation of the unknown image captured by an optical subsystem is matched against prestored quantities, thereby, identifying the invariant edge feature relations within the unknown object. The process of the above referenced inventions only matches feature relations of the input with those represented by the prestored digital quantities. To recognize the unknown object, it is necessary to establish the universal relationships among all the edge features associated with the recognized invariant digital quantities. The process of relating or binding the associated edge features into a complete pattern is in an underlying sense related to coherence measurement. In the aforementioned U.S. patent application Ser. No. 08/833,482 having Attorney Docket No. 77387, a process of generating pseudo-random sequences associated with specific edge features is described as a means of characterizing the coherence of the edge features. It would be beneficial if a dedicated processor could be provided optimized for the noise coding processing so as to reduce the computational time to a manageable level. As it will be shown, the nature of the noise coding lends itself well to implementation on pipeline type architecture. The present invention provides noise coding to be implemented on a system that utilizes practices and techniques of conventional computer architecture.

OBJECTS OF THE INVENTION

It is, therefore, a primary object of the present invention to provide a noise coding processor that incorporates pipeline processing techniques consistent with conventional computer architectures that will permit the efficient high speed implementation of feature binding by the parallel generation and summation of pseudo-random sequences representative of detected feature relations.

It is a further object of the present invention to provide a noise coding processor that incorporates pipeline processing techniques consisting of an array of registers in which operations are applied to the data as it moves from register to register.

Another object of the present invention is to provide for pseudo-random number generation using bus operations in which the bus implements the shifting of bits as data is passed from one register to the next and in conjunction with the shifting operations, applies the exclusive or (XOR) operation to some bits and places the result in the next register with the shifted bits.

It is still a further object of the present invention to provide for the control of pseudo-random sequences being generated along an array of registers for determining the beginning, ending and phase of the pseudo-random sequence generation.

Additionally, it is an object of the present invention to provide an adjacent array of registers so that upon each cycle of operation, the contents of the first array registers may be added into the adjacent array of registers in a register-wise manner.

Further still, it is an object of the present invention to provide a noise coding processor incorporating pipeline processing techniques and that accepts multiple input digital signals derived from the correlation or matching between digital quantities representing the input and stored digital quantities, generating pseudo-random sequence outputs therefrom when the features of the unknown object correspond to the stored digital quantities.

According to the present invention, pattern recognition based on feature binding of feature decomposed imagery is implemented by a noise coding processor having a pipeline architecture. This device consists of a linear array of identical circuit elements containing various register and control units. Each element is referred to as a segment while the entire array is referred to as a segment block. The registers of a given segment each holding a predetermined number of bits are identified as a start register, a stop register, a random number register, and a sum register. The add unit is connected to receive the contents of its respective random number register within the respective element and adds such contents to the sum register within its respective element and then the sum of the addition is added to the respective sum register in response to a control signal. The noise code processor further comprises interconnecting means between the random number registers comprising first means and second means. The first means interconnects the output of the random number register of one element to the input of the random number register of an adjacent element in a bit-wise manner. The second interconnecting means comprises a unit to perform a shift and exclusive or (XOR) function which manipulates the content of the random number register of the one element by the operation of shift and XOR function before being applied to the inputs of the random number register at the adjacent element. This generates a new pseudo-random value from the-pseudo-random value in the previous element.

DETAILED DESCRIPTION OF THE PREFERRED EMBODIMENTS

Figure 1:
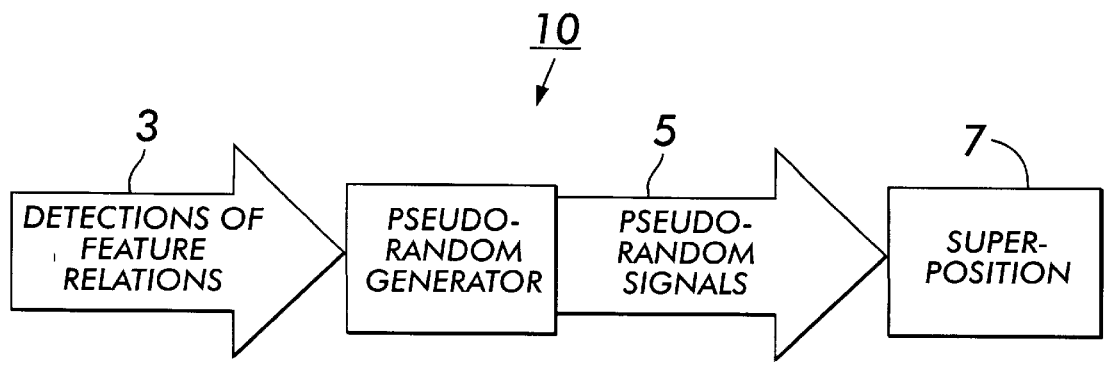
FIG. 1 is a block diagram showing the basic functioning of the noise coding processor of the present invention.

With reference to the drawings, wherein the same reference numbers indicate the same elements throughout, there is shown in FIG. 1 a block diagram of a noise coding processor 10 of the present invention. The noise coding processor 10 generates pseudo-random signals 5 representative of detections of feature relations 3. The means for performing feature decomposition and detection of the feature relations are further described in U.S. patent application Ser. No. 08/833,482 having Attorney Docket No. 77387. The pseudo-random signals 5 generated in the processor are then superposed or summed together in the noise coding processor 10, in particular, the superposition section 7 of the noise coding processor 10. The noise coding processor 10, as will be further described, is divided into identical sections that generate sections of multiple pseudo-random sequences in parallel which may be further described with reference to FIG. 2 illustrating further details of a section 12 of the noise coding processor 10.

Figure 2B:
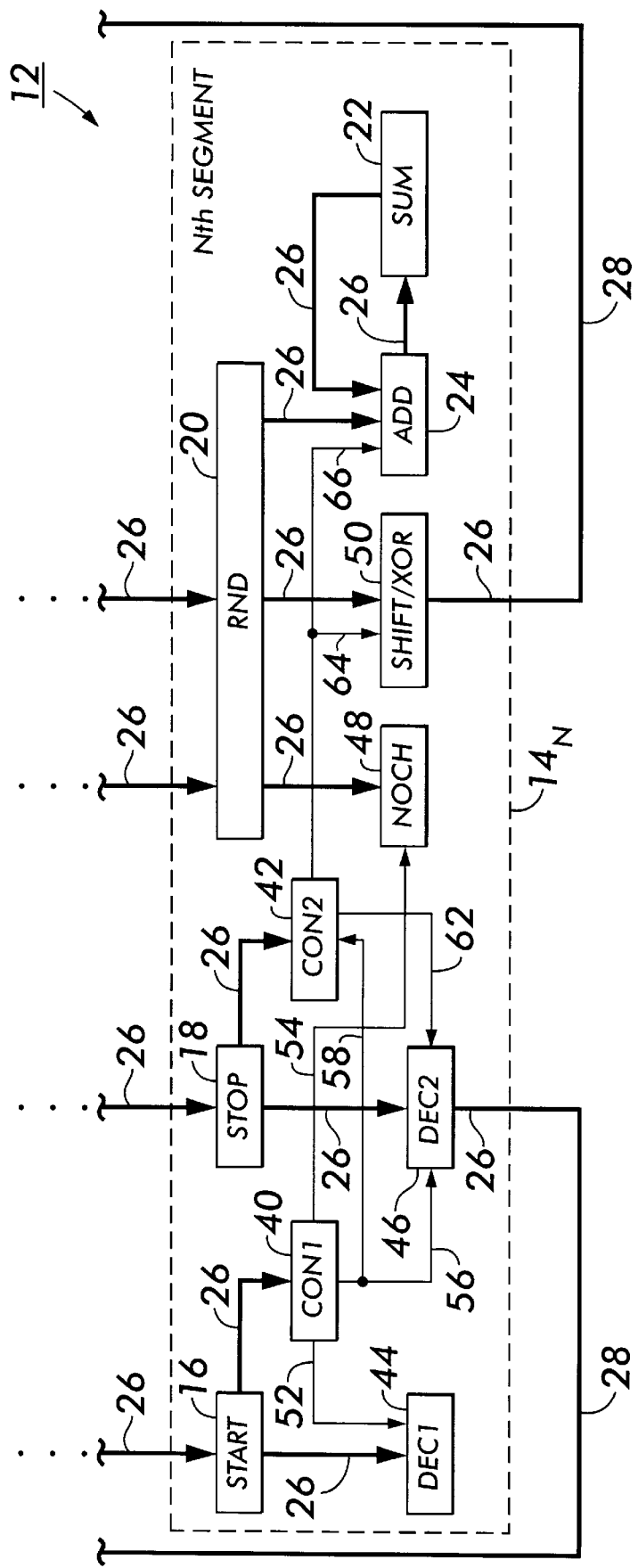
FIG. 2 is a diagram of the noise coding processor section or segment block.

Each noise coding processor section 12 shown in FIG. 2 comprises N segments and is henceforth referred to as a segment block. The segment block 12 is arranged with first and second segments $14_1$ and $14_2$ and having sequential identification increasing by 1 until the Nth segment $14_N$, is reached.

The segment $14_1 \ldots 14_N$ is the basic processing unit of the present invention. Each of the segments $14_1 \ldots 14_N$ comprises registers each holding a predetermined number of bits and identified as a start register 16, a stop register 18, a random number (RND) register 20, and a sum register 22. Each registers 16, 18, 20 and 22 of each element $14_1 \ldots 14_N$ is comprised of circuit components that hold values. An add unit 24 is connected to receive the contents of the random number register 20 within its respective element and adds the contents of the random number register 20 to the sum register 22 within the respective segment and then transfers the sum of the addition to the respective sum register 22 in response to an external control signal (to be described). Each unit, such as add unit 24, of each segment $14_1, \ldots 14_N$ is comprised of circuit components that perform operations on values or control operations on values.

Figure 5A:
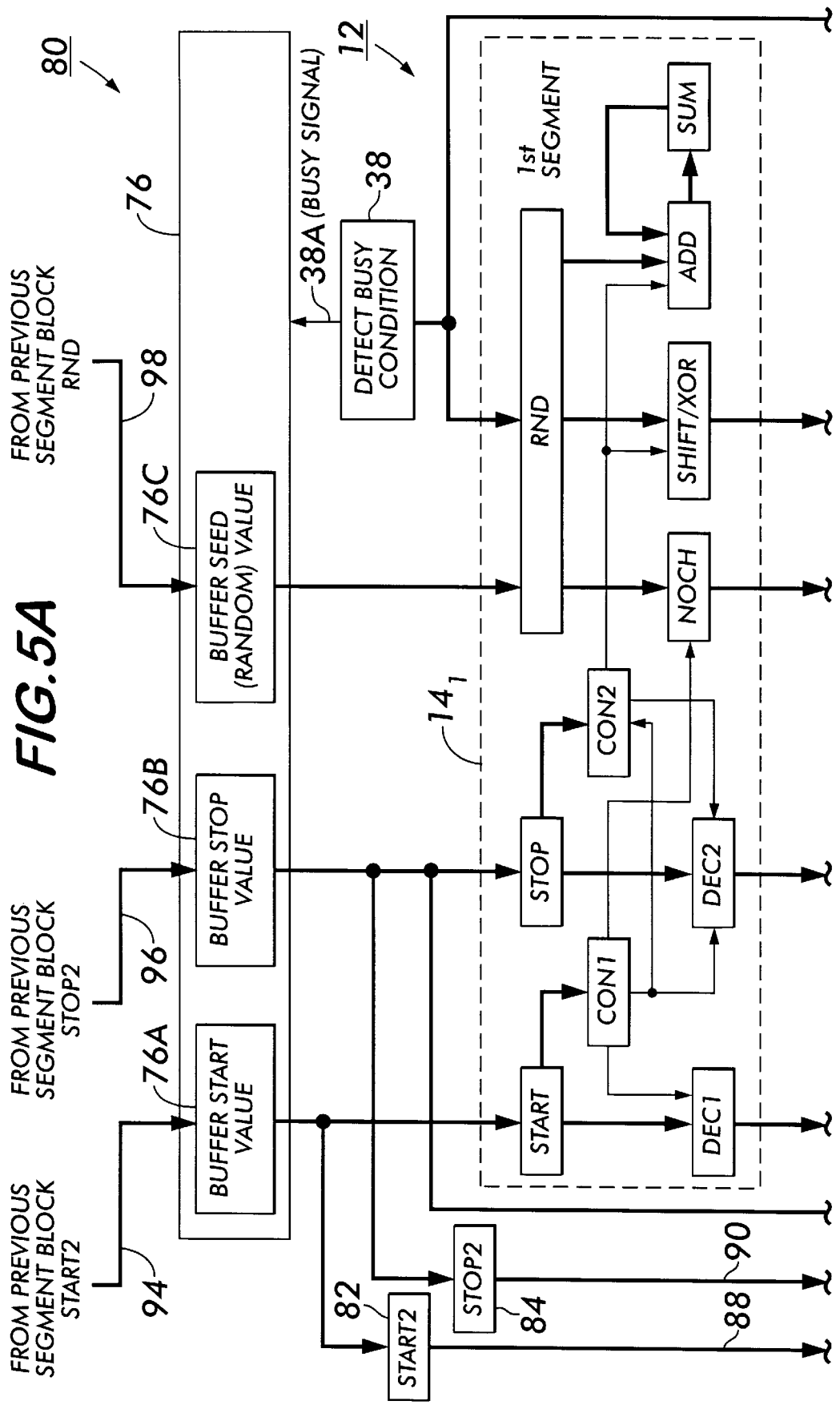
FIG. 5 illustrates a modified version of FIG. 2 for generating serial pseudo-random sequences.
Figure 5B:
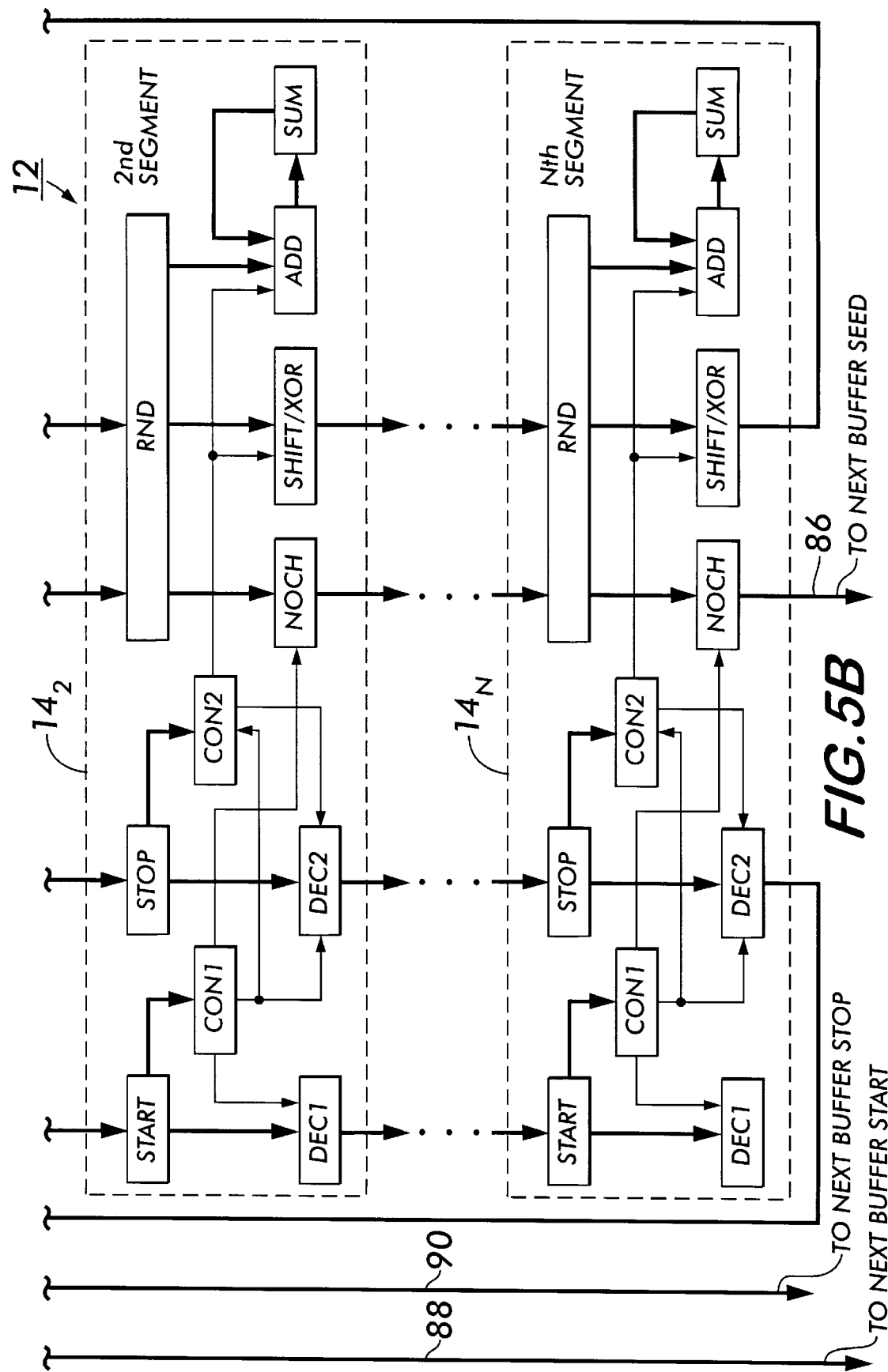

The segment block 12 of FIG. 2, as well as the variant of FIG. 5 to be described, transports data by a data bus 26, wherein each bus 26 carries the data from one segment to the next segment in a bit-wise manner along parallel wires but is represented as a single thick arrow in FIGS. 2 and 5. For example, a separate data bus 26 carries input data to a stop register 18 and a separate data bus 26 carries the output data from the stop register 18 to a second controller unit 40 to be described. The segment block 12 further comprises a wrap-around bus 28, to be described hereinafter, interconnecting a second decrementing unit 46 and shift/XOR unit of the last segment $14_N$ to the stop register 18 and random number register 20, respectively, of the first segment $14_1$.

The input data to the segment block 12 is supplied by input entry means (not shown) and comprises initial values for the start register 16 on signal path 30, for the stop register 18 on signal path 32, and random number register 34 on signal path 34. The initial value for the random number register 20 is termed the seed value and the information on signal paths 30, 32, and 34 is respectively indicated as enter start value, enter stop value and enter seed value. The first segment $14_1$ of the segment block 12 is referred to as the segment block entry point. Wrap-around information, to be described, is allowed to enter the random number register 20 of the first segment $14_1$ by the wrap around bus 28. The wrap around data applied to the random number register 20 is outputted from the SHIFT/XOR unit of the last segment $14_N$. To prevent data from an input source, such as that appearing on signal path 34, from being entered simultaneously with wrap-around data on the wrap-around bus 28, a bus monitoring unit 38 (detect busy condition) detects when the wrap-around bus 28 is busy. If the wrap-around bus 28 is found to be busy, a busy signal 38A is sent to the input entry means (not shown) to prevent data from appearing on signal path 34.

Each of the start, stop and random number registers of segments $14_1$, $14_2$ ... $14_N$ has means for receiving respective start, stop and seed values. Further, all the registers shown in FIGS. 2 and 5 have means for supplying output signals representative of their contents. As used herein, unless otherwise specified, the output signals of the registers represent the contents of the information stored in the registers.

Each of the segments $14_1$, $14_2$ ... $14_N$ further comprises first and second controller units (CON1 and CON2) 40 and 42, and first and second units for decrementing 44 (DEC1 and DEC2) and 46. The first controller unit 40 and the first unit for decrementing 44 receive the output of the start register 16 and the second controller unit 42 and the second unit for decrementing 46 receive the output of the stop register 18. The first and second controller units 40 and 42 are respectively responsive to preselected values of the contents of the start and stop registers 16 and 18. The first and second controller units 40 and 42 issue enabling and disabling signals which respectively enable and disable the units that receive the issued signals. The preselected values may, for example, represent that the contents of the stop register 18 is zero. These preselected values are to be further described herein.

The first controller unit 40 issues first and second enabling signals 52 and 54 that are respectively routed to the first unit for decrementing 44 and to the unit NOCH 48. The NOCH unit 48 may be referred to as a data preserving connecting unit, i.e., no change (NOCH) in data in a manner as to be further described with reference to FIG. 3. The first controller unit 40 respectively issues first and second disabling signals 56 and 58 that are respectively routed to the second unit for decrementing 46 and to the second controller unit 42.

The second controller unit 42 issues a first enabling signal 60 and a first disabling signal 62. The first enabling signal 60 is routed to the SHIFT/XOR unit 50, via signal path 64, and also to the add unit 24, via signal path 66. The SHIFT/XOR unit 50 may be referred to as data modifying connecting unit because of its operation to be further described with reference to FIG. 3.

The noise coding processor 10 may be used, for example, in the practice of the invention described in the cross-referenced U.S. patent application Ser. No. 08/833,482 having Attorney Docket No. 77387 related to recognition of an unknown object using feature decomposition based pattern recognition techniques. As more fully disclosed in the U.S. patent application Ser. No. 08/833,482 having Attorney Docket 77387, once the features are characterized by quantities such as multi-scale edge segments (MSESs), chordal triangle (CT), chordal triangular invariant (CTI), center relation factor (CRF) and relative center (RC), the identified quantities need to be related to each other. This identification process should be computationally efficient since there are an enormous number of features. The process of the present invention that is referred to as noise coding is used to characterize the coherence of edge feature relations derived from, for example, wavelet projection transform (WPT) more fully disclosed in the U.S. patent application Ser. No. 08/833,482 having Attorney Docket 77387.

The basic principle of operation of the noise coding processor 10 is based on the superposition of pseudo-random noise. More particularly, for n times, if a pseudo-random signal is superposed coherently or in phase, i.e., added to itself n times with no shifts with respect to itself, the amplitude of the superposed pseudo-random sequence is on the order of n. However, if the pseudo-random sequence is superposed with respect to itself incoherently or out of phase, i.e., randomly shifted with respect to itself, the amplitude will be on the order of $\sqrt{n}$. This super-position property permits a relatively small number of coherent superpositions to standout against a much larger number of incoherent superpositions. This is an important property because it is expected that the number of spurious matches between the aforementioned stored digital quantities, CTIs from a prototype, and those of the input digital quantities, i.e., CTIs from clutter, noise and man made structures other than the target, greatly exceed the number of true matches. These coherent superpositions may be detected by a simple matched filter process and yields a well defined correlation peak indicating the recognition, and by the peak's position, the position of the unknown object.

As more fully described in U.S. patent application Ser. No. 08/833,482 having Attorney Docket 77387, certain features, such as the CTI digital quantities (or TI digital quantities), are prestored in a CTI library serving as a bank of reference signals. Input CTIs that correspond to the CTI library, no matter what the position of the input CTs that the input CTI is derived from, should generate identical relative centers (RCs). Therefore if an input pattern corresponds to the CTI library, the pattern through the generations of RCs should cause coherent superposition of noise coding sequences. Noise and clutter will cause incoherent superposition of the pseudo-random sequences.

The noise coding processor 10 of the present invention may be implemented to accomplish the noise coding referred to in U.S. patent application Ser. No. 08/833,482 having Attorney Docket 77387 by performing the following six steps; (1) associate with each reference CTI class a pseudo-random sequence having dimensionality corresponding to the dimensions of the wavelet projection transform (WPT) dimensions, i.e., four dimensional quantities of wavelet projection transform should utilize a pseudo-random sequence that accommodate four dimensional (4-D) quantities; (2) based on each class pseudo-random sequence, generate a correlation reference functions for that pseudo random sequence; (3) let an RC derived from and input CT corresponding to a correlated input CTI determine the phases of the pseudo-random sequencies for all its dimensions such that the RC provides offset values for all dimensions of the pseudo-random sequence corresponding to the class of the reference CTI that was correlated with the input CTI; (4) superpose all shifted pseudo-random sequences; (5) correlate the superposition of the shifted pseudo-random sequences with the reference functions for each class; and (6) if a pattern of a particular class is present in the input, there will be a coherent superposition of pseudo-random sequences resulting in a correlation peak in the correlation domain. The position of the correlation peak will be determined by the patterns position in the wavelet projection transform (WPT) domain.

Pseudo-random sequences related to the present invention may be generated digitally by simple bit operations. One of the simplest yet efficient ways to generate pseudo-random values by bit operations is as follows. Consider an n-bit register whose contained bit pattern represents an arbitrary number. This number is referred to as the "seed" value. The process of the present invention for generating the pseudo-random sequence in general is as follows: (1) take the two rightmost bits and perform an exclusive-OR (XOR) function operation; (2) shift right all the bits one position to the right (the last one falls off); (3) place the output bit of the exclusive-OR function in the leftmost position. This process generates a number. This may be done over and over again generating a sequence of numbers that appear to be random. Eventually the sequence will repeat itself. The interval of repetition depends on the size of the bit field.

The above process can be implemented in a pipelined architecture that permits parallel generation of multiple random sequences. The key element of the pipeline is a special bit transfer means that implements the aforementioned pseudo-random sequence generation. The pipeline pseudo-random sequence may be further described with reference to FIG. 3. In general, the SHIFT/XOR unit 50 shown in FIG. 3 serves as the means for interconnecting the outputs of the random number register 20 of one segment to the inputs of the random number register 20 of an adjacent segment. A buffer register 21 holds a copy of the value contained in the RND register immediately preceding it. The buffer register 21 is considered to be part of the SHIFT/XOR unit 50 and hold data while the data is being processed by the SHIFT/XOR unit 50. The SHIFT/XOR unit 50 and the bus lines carrying the data between the buffer register 21 and adjacent RND register 20 are responsive to the first enable signal, via signal path 64 (see FIG. 2), of the second controller 42 and shifts respectively the contents of bit positions 1, 2, . . . n−1 of the random number register 20 of one segment to the bit positions 2, 3, . . . n of the random number register 20 of an adjacent segment and performs an exclusive OR function on the bit of the n−1 position and the bit of the n position of the random number register 20 of the one segment and applies the output of the exclusive OR function to bit 1 of the inputs of the random number register 20 at the adjacent segment.

Figure 3:
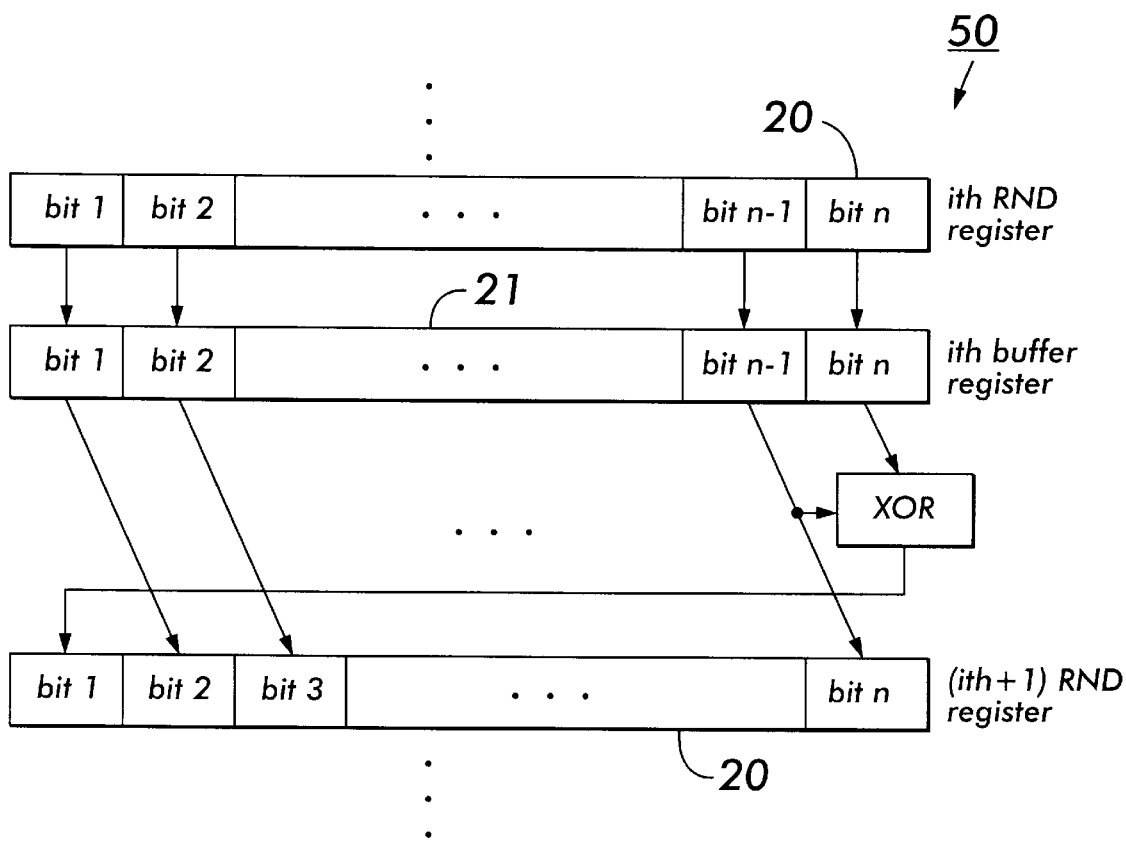
FIG. 3 is a functional block diagram illustrating the operation performed by the SHIFT/XOR means of FIG. 2.

More particularly, the bus lines between the buffer register 21 and adjacent RND register 20 of FIG. 3 are connected obliquely for almost all the bits so that the jth bit position in the ith buffer register, such as that of segment $14_1$, is connected to the jth+1 bit position in the ith+1 RND register, such as that of segment $14_2$. The exception to this is in the nth bit on the ith register (segment $14_1$). An exclusive-OR (XOR) function operation is performed in response to the enable signal on signal path 64 of controller unit 42 on the nth and nth−1 bits, with the result being written to the first bit position on the ith+1 RND register (segment $14_2$). During each cycle of operation of the noise coding processor 10, in a given segment block 12 (see FIG. 2), the bus takes the value in the random register immediately above it, and using the above described process, generates a new pseudo-random value in the random register in the adjacent segment. A pseudo-random sequence is generated by the propagation of the above process along the segment block 12 of FIG. 2. The operation of the arrangement of FIG. 3 is referred to as a SHIFT/XOR means and which is the special bit transfer means previously referred to in the present invention.

The seed value (see FIG. 2) is inputted at the random number (RND) register of the beginning segment, such as $14_1$. During each cycle of the segment block 12, a new pseudo-random value is generated one random register further down from the random register of the initial segment. In a pipeline processor, such as that of the segment block 12 of the noise coding processor 10, processing is associated with the movement of data through the system. As soon as one random value is generated by the initial element, such as the random number register 20 of segment $14_1$, the same register is available to accept a new seed value. The sequence generation moves down the segment block 12 from the initial segment, generating a pseudo random sequence corresponding to the initial seed. As the sequence generation moves from one segment to the next, the previous segment is available for generating the next pseudo-random value of a different sequence. Eventually, all the segments are employed to simultaneously generate pseudo-random values for different sequences simultaneously. The computation ability should scale linearly with the number of segments.

Detailed Operation of the Noise Coding Processor

Each segment $14_1$ . . . $14_N$ shown in FIG. 2 of the segment block 12 of the noise coding processor 10, in addition to the SHIFT/XOR unit 50, has the following integer registers containing the following contents: (1) the START register 16 containing a value representing the position in the array where the noise coding processing begins; (2), the STOP register 18 containing a value representing where the noise coding processing ends; (3) the random number (RND) register 20 containing the seed/random number value; (4) the sum (SUM) register 22 containing all the sum of the random number values of the RND register 20. As previously discussed, the initial values for the START, STOP and RND registers of the segment $14_1$ are respectively supplied by way of signal paths 30, 32 and 34.

Between any two RND registers 20 there are two circuit units that function in conveying data from one RND register to the next: (1) the NOCH unit 48 which acts like a straight through data path conveying the value of the RND register 20 immediately above to the RND register 20 immediately below unchanged; and (2) the previously described SHIFT/XOR unit 50 including buffer register 21 thereof shown in FIG. 3. In addition, every RND register 20 is connected to an ADD unit 24 which adds the contents of its respective register 20 with that contained in the respective sum (SUM) register 22 and then writes the resulting sum to the same SUM register 22. These three units (NOCH 48, SHIFT/XOR 50 and ADD 24) only function when they receive enable signals from controller units CON1 and CON2 (40 and 42) respectively. CON1 unit 40 tests the value in the START register 16 that it receives. If the value contained in this START register 16 is greater than zero, then during the processing cycle of the noise coding processor 10, enable signals are sent to DEC1 44 and NOCH 48 from CON1 unit 40. In addition, disable signals are sent to CON2 unit 42 and DEC2 unit 46 from CON1 unit 40. For CON2 unit 42, if the value contained in the STOP register 18 contents CON2 unit 42 receives is greater than zero, and no disable signal is received by CON2 unit 42, then CON2 unit 42 sends enable signals to the SHIFT/XOR unit 50 and ADD unit 24. It should be noted that the values in the START, STOP and RND registers vary for each segment $14_1$, $14_2$ . . . $14_N$ since each segment is employed in the generation of a different pseudo-random sequence.

If the value contained in the STOP register 18 equals zero, then a disable signal in the associated segment of the STOP register 18 is sent by CON2 unit 42 to DEC2 unit 46. DEC1 unit 40 and DEC2 unit 42 are deincrementation units, sometimes referred to as decrementers. As used herein, deincrementation or decrementing refers to taking an integer value and subtracting one from it. DEC1 unit 44 only decrements if it receives an enable signal from CON1 unit 40. If so, it takes the value contained in the START register 16 immediately above it, deincrements it and then writes the result to the START register 16 immediately below it. Conversely, DEC2 unit 46 functions as long as it does not receive a disable signal from either CON1 unit 40 or CON2 unit 42. If the value in the STOP register 18 immediately above DEC2 unit 46 (as viewed in FIG. 2) is greater than zero, DEC2 unit 46 decrements that value and then writes the result to the STOP register 18 immediately below it. When DEC1 unit 44 does not receive the enable signal from CON1 unit 40, DEC1 unit 44 behaves like a straight through data path conveying the contents of the immediately above START register 16 to the immediately below START register 16. DEC2 unit 46 behaves the same as DEC1 unit 44 with respect to the STOP register 16 when receiving the disable signal from either CON1 unit 40 or CON2 unit 42.

The given segment block 12 is initialized by way of the signal path 34 inputting a seed value into the RND register 20, signal path 30 inputting a starting position value into the START register 16, and signal path 34 inputting a stopping position value into the STOP register 18 (the STOP value will be a constant and correspond to the number of segments in the segment block 12) of the first segment of segment block 12, i.e., segment $14_1$. For example, if the segment block 12 has ten (10) segments ($14_1$, $14_2$ ... $14_{10}$), then the stop value entered into the STOP register 18 of the segment $14_1$ is 10. The initial input results in the sequential generation of ten (10) pseudo random values as data is transferred from one segment to the next. Furthermore, at any given instant, each segment $14_1$, $14_2$ ... $14_N$ of the segment block 12 can be involved in the computation of ten (10) different pseudo-random sequences. When the value of START register 16 reaches zero, then for all subsequent movements on any of the buses 26, the STOP register 18 is decremented by one and the value in the RND register 20 is not passed by SHIFT/XOR unit 50. Again, it should be recognized that because the noise code processor 10 has a pipeline architecture, movement of data and control thereof is occurring in each segment $14_1$ ... $14_N$ of the segment block 12. During each cycle, the value contained in RND register 20 is added to the value in the SUM register 22 by the ADD unit 24. This addition continues until STOP register 18 is decremented to zero. If the STOP register 18 does not reach zero before the end of the segment block 12, the values in STOP (by way of DEC2 unit 42) and RND (by way of SHIFT/XOR unit 50) registers 18 and 20, respectively, are conveyed by the wrap-around bus 28 to the beginning of the particular segment block 12. More particularly, if STOP register 18 does not reach zero before reaching the $14_N$ segment, then the wrap-around operation takes place. As soon as an initial input moves to the second segment ($14_2$) of segment block 12, a new initial input may be inputted into the first segment ($14_1$) of segment block 12. More particularly, as soon as the initial values entered into the registers of the $14_1$ segment moves to the $14_2$ segment, new data may be entered into the START, STOP and RND registers of the $14_1$ segment.

It should now be appreciated that the practice of the present invention provides a noise coding processor 10 that incorporates pipeline processing techniques. The embodiment of FIG. 2 is related to a single segment block of data comprised of a segment block 12 of segments defined by segments $14_1$, $14_2$ ... $14_N$. The array or segment block 12 of FIG. 2 is one (1) dimensional which accommodates one dimensional input data, but the practice of the present invention easily accommodates multi-dimensional data to provide noise coding therefor.

Figure 4:
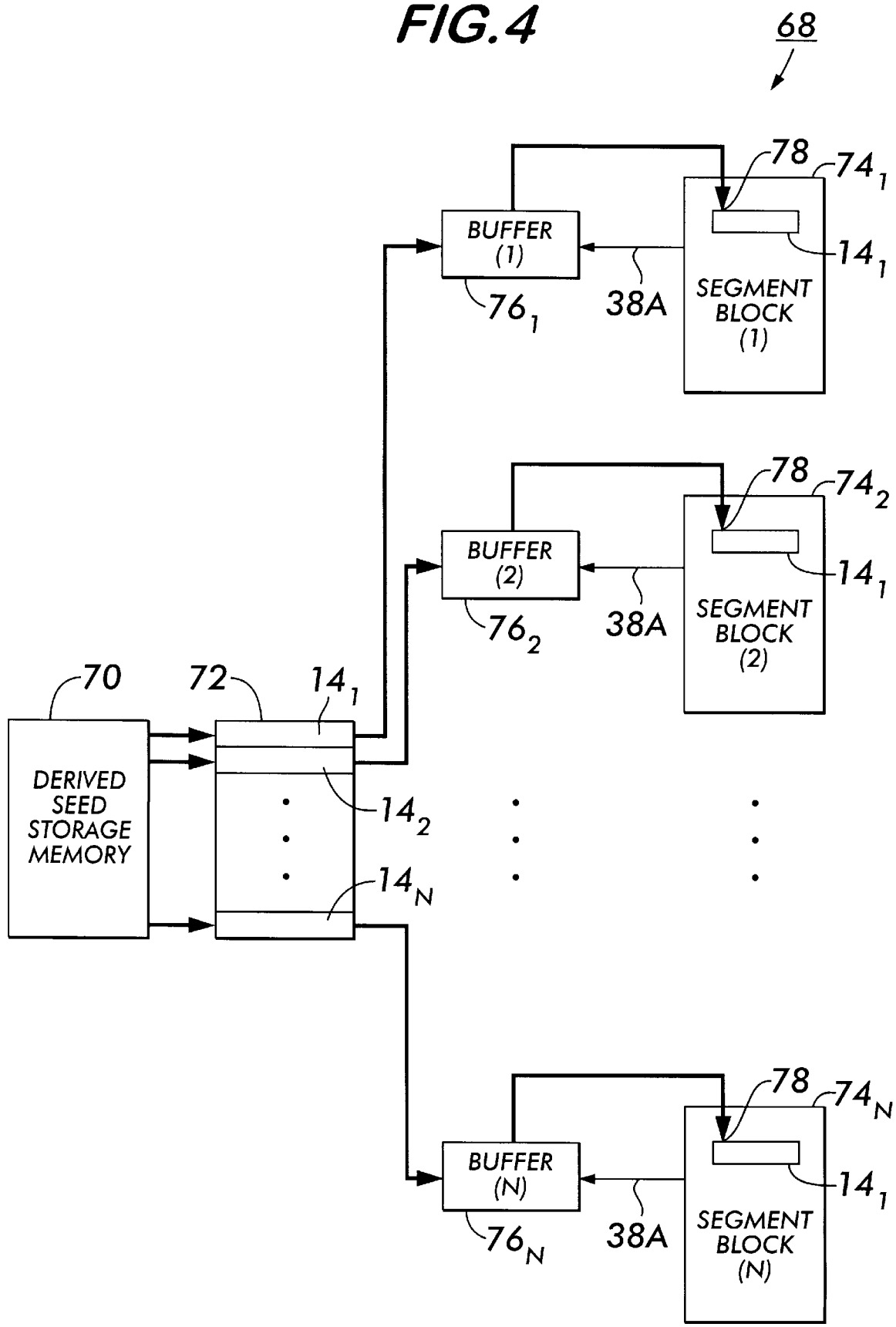
FIG. 4 illustrates a parallel arrangement involved in generating a two dimensional or higher pseudo-random sequence using an array of segments.

In the noise coding processor 10 one may generate two dimensional or higher fields of pseudo-random values using the above one-dimensional segment blocks 12 of FIG. 2. For example, an arbitrarily sized two dimensional pseudo-random field of dimensions M×N may be broken into sections so that an M×N field is equivalent to M sections each containing N values. M segment blocks each having N segments would be employed in the generation of the sequence. Each section of the pseudo-random sequence may be generated independently if the beginning random value for the particular section is known, i.e., generate the sequence conventionally, divide the sequence into sections and find the first value of each section. Let us refer to these pseudo-random values used to generate individual sections as derived seeds. Now M derived seeds applied to M segment blocks having N segments defines an M×N pseudo-random field. The phase of the quantity along the M dimension can be determined by shifting (with wrap-around) the array of derived seeds. The phase of the quantity along the N dimension is a function of the start value as described previously. The practice of the present invention for generating, in a parallel manner, at least two dimensional arrays may be further described with reference to FIG. 4 illustrating an arrangement 68 comprised of a plurality of segments given in Table 1.

TABLE 1

| Reference Number | Element |
|---|---|
| 70 | Derived Seed Storage Memory |
| 72 | Derived Seed Shift Array |
| $74_1$ | Segment block 1 |
| $74_2$ | Segment block 2 |
| $74_N$ | Segment block N |
| $76_1$ | Input Buffer Register for Segment block 1 |
| $76_2$ | Input Buffer Register for Segment block 2 |
| $76_N$ | Input Buffer Register for Segment block N |

In this method of generating the M×N field, the $14_1$ segment of the segment block 12 is referred to as the segment block entry point register. The arrangement 68 consists of M segment blocks each having N segments with the first segment of each segment block, i.e., segment $14_1$ serving as the entry point 78 in a manner similar to that discussed with reference to FIG. 2. The derived seed shift array 72 receives its input quantities from the derived seed storage memory 70. The derived seed shift array 72 contains derived seeds, start values and stop values (the start and stop values would be equal for all segment blocks). The derived seed shift array 72 comprises a plurality of segments $14_1$, $14_2$ ... $14_N$ each of which is connected to the entry point 78 of a corresponding segment block $74_1$, $74_2$ ... $74_N$ via buffers $76_1$, $76_2$ ... $76_N$. The derived seed shift array 72 has the ability to implement shift with wrap-around, in a manner known in the art, and receives an ensemble of derived seeds from the derived seed storage memory 70. Upon receiving the derived seeds, the derived seed shift array 72 performs shifting with wrap-around operation to set the phase of the quantity being analyzed, previously described, along the M dimension. The derived seed shift array 72 then conveys the shifted derived seeds to their corresponding segment blocks (START and STOP values will also be conveyed to the segment blocks). More particularly, the derived seed shift array 72 conveys the derived seed values of its segments $14_1, 14_2 \ldots 14_3$ respectively to segment blocks $74_1, 74_2 \ldots 74_3$ (specifically, segment $14_1$ of each segment block $74_1, 74_2 \ldots 74_3$) by way of buffers $76_1, 76_2 \ldots 76_N$. If a given segment block $74_1, 74_2, \ldots 74_N$ is busy, indicated by signal 38A previously described with reference to FIG. 2, the derived seed destined for that segment block is temporarily stored in the associated buffer $76_1, 76_2 \ldots 76_N$ until the busy state ends. The buffers $76_1, 76_2 \ldots 76_N$ each have enough storage capacity to hold a sequence of data transmission from the derived seed array 72 if the segment blocks 1, 2 ... N are busy over multiple cycles. By shifting within sections of the derived seed registers of the derived seed shift array 72 for the M dimension, and then shifting the whole sections of the sequence in the corresponding segment block $74_1, 74_2 \ldots 74_N$ by controlling the START position, generation of two dimensional pseudo-random sequences are implemented and in a parallel manner. Still higher dimensions can be generated. For three dimensions the derived seed shift array can be divided into L sections each having M subsections. First whole sections can be shifted (with wrap around) producing shift along the L dimension. Secondly, shifting (with wrap around) is performed within the individual subsections producing shift along the M dimension. Finally, data would be conveyed to the segment blocks producing shift along the N dimension. By using hierarchies of sections still higher dimensionalities may be achieved.

Another approach permits serial generation of sections of pseudo-random sequences. The practice of the present invention for serially generating pseudo-random sequence may be further described with reference to FIG. 5 illustrating an arrangement 80. The arrangement 80 is quite similar to the arrangement 10 of FIG. 2 having the segment block 12 and the segment $14_1, 14_2 \ldots 14_N$, but in addition thereto includes two registers which are the START2 and STOP2 registers indicated in FIG. 5 with reference numbers 82 and 84 respectively. These registers 82 and 84 (START2 and STOP2) simply store the original starting and stopping values of the segment block 12 since the values contained in START and STOP registers of the segment block 12 are decremented to zero in a manner as hereinbefore described with reference to FIG. 2. Upon passing a random number register (RND) value from one segment block to the next as shown in FIG. 5 as signal path 86 indicated as next buffer seed, the starting and stopping values are passed along to the next segment block by way of signal paths 88 and 90 respectively identified as to next buffer start and to next buffer stop. The passing of the information on signal paths 86, 88 and 90 is accomplished in response to a second control signal (not shown for the sake of clarity) that is routed to the NOCH unit of segment $14_N$ and to the second start and stop registers 82 and 84. Another distinction between the segment block of FIG. 2 and the segment block of FIG. 5 is that in the latter, an enable signal is conveyed to the NOCH unit 48 from CON2 42 when the value contained in the STOP register 18 is equal to zero (0). The serial generation of the pseudo-random sequence accomplished by the arrangement 80 of FIG. 5 may be further described with reference to FIG. 6 illustrating an arrangement 92.

Figure 6:
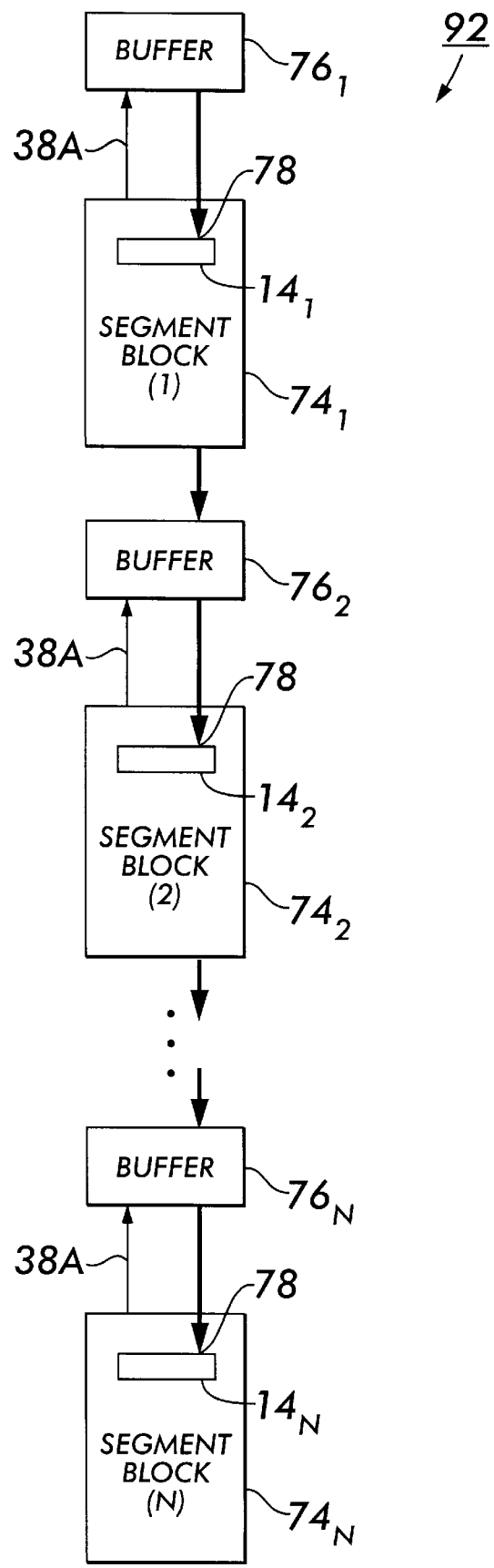
FIG. 6 illustrates an overall flow involved in the serial generation of pseudo-random sequences of FIG. 5.

The arrangement 92 of FIG. 6 for implementing the noise coding processor 10 is comprised of the components $76_1, 76_2 \ldots 76_N, 74_1, 74_2 \ldots 74_N$, along with entry points 78 and busy signals 38A previously described with reference to the parallel arrangement 68 of FIG. 4, but, unlike the parallel arrangement 68 of FIG. 4, the arrangement 92 of FIG. 6 is a serial arrangement. FIG. 6 illustrates buffers $76_1, 76_2 \ldots 76_N$ as the interface device connecting the segment blocks 1 ($74_1$), 2 ($74_2$) ... N ($74_N$) together. The buffers $76_1, 76_2 \ldots 76_N$ provide buffering for three quantities, i.e., the starting, stopping and random quantities, as well as to respond to the busy signal 38A and may be further described with reference back to FIG. 5.

FIG. 5 generally identifies the buffer ($76_1, 76_2 \ldots 76_N$ of FIG. 5) with reference number 76. Buffer 76 consists of buffer registers 76A, 76B and 76C respectively identified as buffer start value, buffer stop value and buffer seed (random) value. The buffer 76 receives the busy signal 38A generated by the detect busy condition circuit 38, previously discussed with reference to FIG. 2, and halt any transfer, in a manner known in the art, to segment block 12 until the busy condition disappears. The segment block 12 of FIG. 5 represents any of the segment blocks 1 ($74_1$), 2 ($74_2$) ... N ($74_N$) of FIG. 6.

The buffer registers 76A, 76B and 76C respectively receive data on signal paths 94, 96 and 98 respectively identified as from previous segment block START2, from previous segment block STOP2, and from previous segment block RND. The transferring of the START2, STOP2 and RND information for the arrangement 80 of FIG. 5, having the general flow of information shown in FIG. 6 for arrangement 92, is accomplished in a manner as previously described, with reference to FIG. 5, for the passing of the starting and stopping values for the serial generation of pseudo-random sequence.

It should now be appreciated that the practice of the present invention has the capabilities of generating sections of multi dimensional pseudo-random sequences in a serial manner (FIGS. 5 and 6) and in a parallel manner (FIG. 4).

It should now be appreciated that the practice of the present invention provides means for interconnecting a plurality of segments comprising at least a first segment block to a plurality of segments comprising at least a second segment block in a parallel manner. Further, it should be appreciated that the present invention provides means for interconnecting a plurality of segments comprising at least a first segment block to a plurality of segments comprising at least a second segment block in a serial manner. Still further, it should be appreciated that the present invention provides means for interconnecting a plurality of segments comprising a first segment block and an additional plurality of segments comprising a second segment block to further segment blocks in an arrangement that comprises a combination of serial and parallel interconnections.

Comparing the two approaches, that is, the serial and parallel approaches for implementing the noise coding processor 10, the latter generates the sequence much faster, but with speed comes the complexity of having to store and shift an array of derived seeds in a manner as described with reference to FIG. 4. However, if desired a combination of the serial and parallel approaches may be implemented for achieving an acceptable speed vs. complexity in the device.

Numerous other variations and modifications of the present invention may be readily apparent to those skilled in the art in light of the above teaching. It is, therefore, to be understood that, within the scope of the appended claims, the invention may be practiced other than as specifically described herein.

What I claim is:

1. A noise coding processor having a pipeline architecture comprising:

(a) an array of segments comprising a segment block having a predetermined number, N, said segment block comprising a plurality of segments, each of said segments comprising an add unit and registers holding a predetermined number of bits 1 . . . n, said registers identified as;
  (i) a start register;
  (ii) a stop register;
  (iii) a random number register; and
  (iv) a sum register;
said add unit being connected to receive the contents of said random number register within its respective segment and add said contents of said random number register to said sum register within its respective segment and then transfer the sum thereof to said respective register in response to a control signal, each of said start, stop and random number registers of the first segment of said plurality of segment having means for receiving a respective initial value and for supplying output signals representative of its contents,
each of said segment further having first and second controller units and first and second units for decrementing, said first controller unit and said first unit for decrementing receiving the outputs of said start register and said second controller unit and said second unit for decrementing receiving the outputs of said stop register, said first and second controller units being respectively responsive to preselected values of the contents of said start and stop registers for issuing enabling and disabling signals which respectively enable and disable units that receive said issued signals, said first controller unit issuing first and second enabling signals and first and second disabling signals, said second controller unit issuing first enabling and first disabling signals with the first enabling signal being applied to said add unit and serving as said control signal, said first controller unit routing its first enabling signal to said first unit for decrementing, its first disabling signal to said second unit for decrementing, and its second disabling signal to said second controller unit, said second controller routing its first disable signal to said second unit for decrementing;

(b) means for interconnecting said registers of said segments comprising;
  (i) first means for respectively interconnecting outputs of said start and stop registers of one segment to the inputs of said start and stop registers of an adjacent segment, said first interconnecting means comprising;
    said first unit for decrementing responsive to said first enabling signal of said first controller unit to decrease the contents of the received start register by one (1) before said contents is applied to the input of the start register of an adjacent segment; and
    said second unit for decrementing receiving said first disable signal of said first controller unit and first disable signal of said second controller unit and responsive to the absence of either of said received first disable signals to decrease the contents of the received stop register by one (1) before said received contents is applied to the input of the stop register of an adjacent segment, and, conversely, when said disabling signal is applied to said second unit for decrementing said second unit for decrementing transfers the contents of the STOP register unmodified to the stop register of the adjacent segment;
  (ii) second means for interconnecting the outputs of said random number register of one segment to the inputs of said random number register of an adjacent segment, said second interconnecting means comprising data preserving connecting unit responsive to said second enable signal of said first controller for directly connecting, on a bit-by-bit basis, the output bits of said random number register of said one segment to the input bits of said random number register of said adjacent segment, said second means for interconnecting further comprising a shift and exclusive OR unit, responsive to said first enable signal of said second controller unit so as to shift the output bits 1, 2, . . . n-1 of the random number register of said one segment to the input bits 2, 3, . . . n of the random number register of said adjacent segment, and perform an exclusive OR function (XOR) on bit n-1 and bit n of the random number register of said one segment and applying the output of said exclusive OR function to bit 1 of said inputs of said random number register at said adjacent segment.

2. The noise coding processor according to claim 1 further comprising means for respectively interconnecting the shift and exclusive OR unit and the second unit for decrementing both of the last segment of said plurality of segments to the stop and random number registers of the first segment of the plurality of segments.

3. The noise coding processor according to claim 2 further comprising means for inhibiting said means for respectively interconnecting the shift exclusive OR unit to said random number register when said random number register of said first segment is receiving initial values.

4. The noise coding processor according to claim 1, wherein said elements of said first segment further comprises:

(a) a second start register and a second stop register having means for receiving said initial values being received by said start and stop registers respectively, said second start register and said second stop register each being responsive to a second control signal for making its contents available as output signals;

(b) means operatively connected to said data preserving connecting unit of the last segment of said plurality of segments and being responsive to said second control signal for making its contents available as output signals;

(c) means for interconnecting said plurality of segments comprising a first segment block to a plurality of segments comprising a second segment block, said segment block interconnecting means comprising;
  first, second, and third buffers for respectively receiving the contents of said second start register, said second stop register and said data preserving connecting unit in response to said second control signal.

5. The noise coding processor according to claim 1 further comprising means for interconnecting in a parallel manner said plurality of segments comprising a first segment block to a plurality of segments comprising a second segment block.

6. The noise coding processor according to claim 1 further comprising means for interconnecting in a serial manner said plurality of segments comprising a first segment block to a plurality of segments comprising a second segment block.

7. The noise coding processor according to claim 1 further comprising means for interconnecting said plurality of segments comprising a first segment block and an additional plurality of segments comprising a second segment block, said interconnecting means interconnecting said first and second segment blocks to said further segment blocks in an arrangement that comprises a combination of serial and parallel interconnections.

* * * * *